Jan. 6, 1931. J. J. LAWLER 1,788,112
THERMOSTATIC MIXING VALVE
Filed Sept. 12, 1929 4 Sheets-Sheet 1

Inventor
James J. Lawler.
By Bryant & Lowry
Attorneys

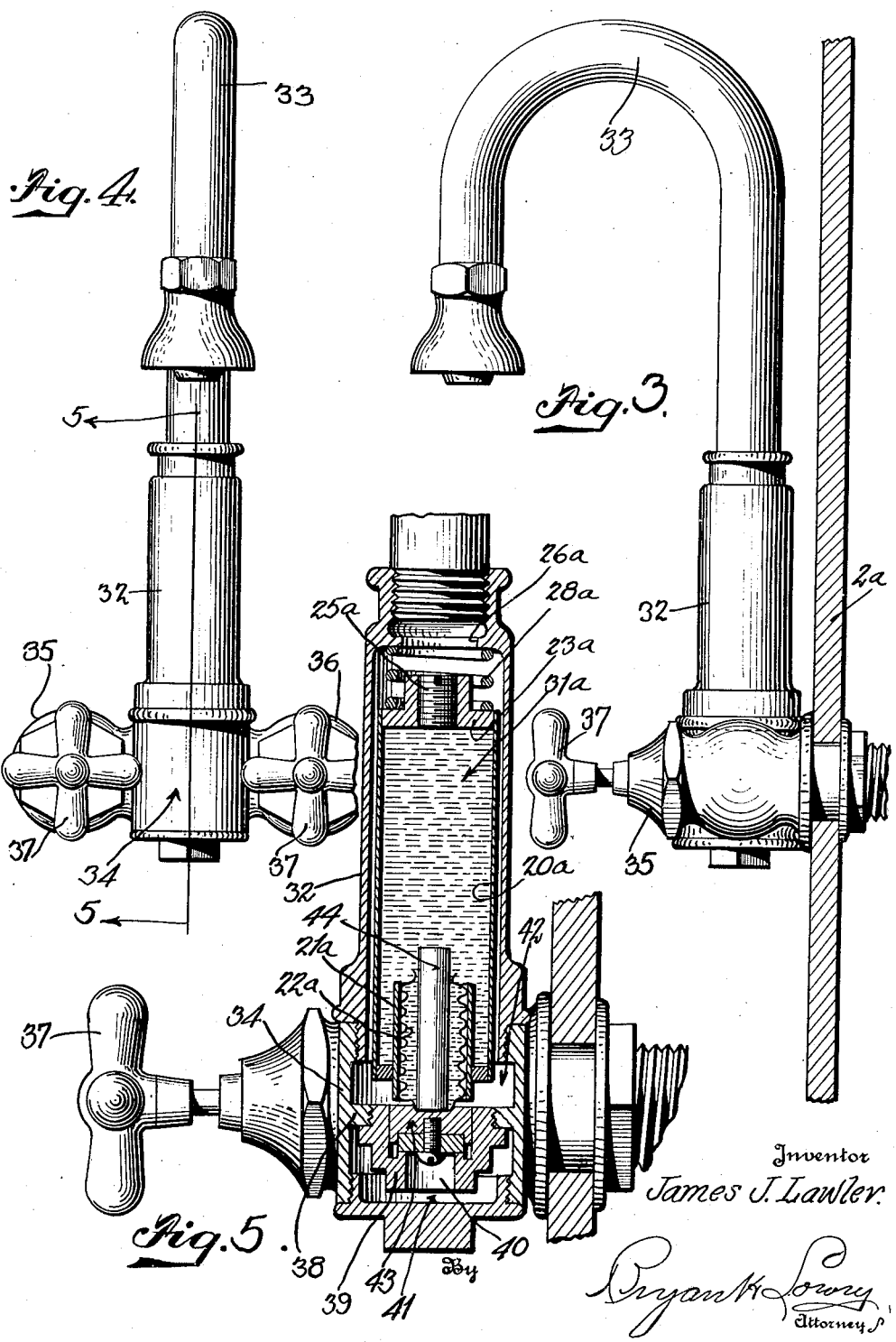

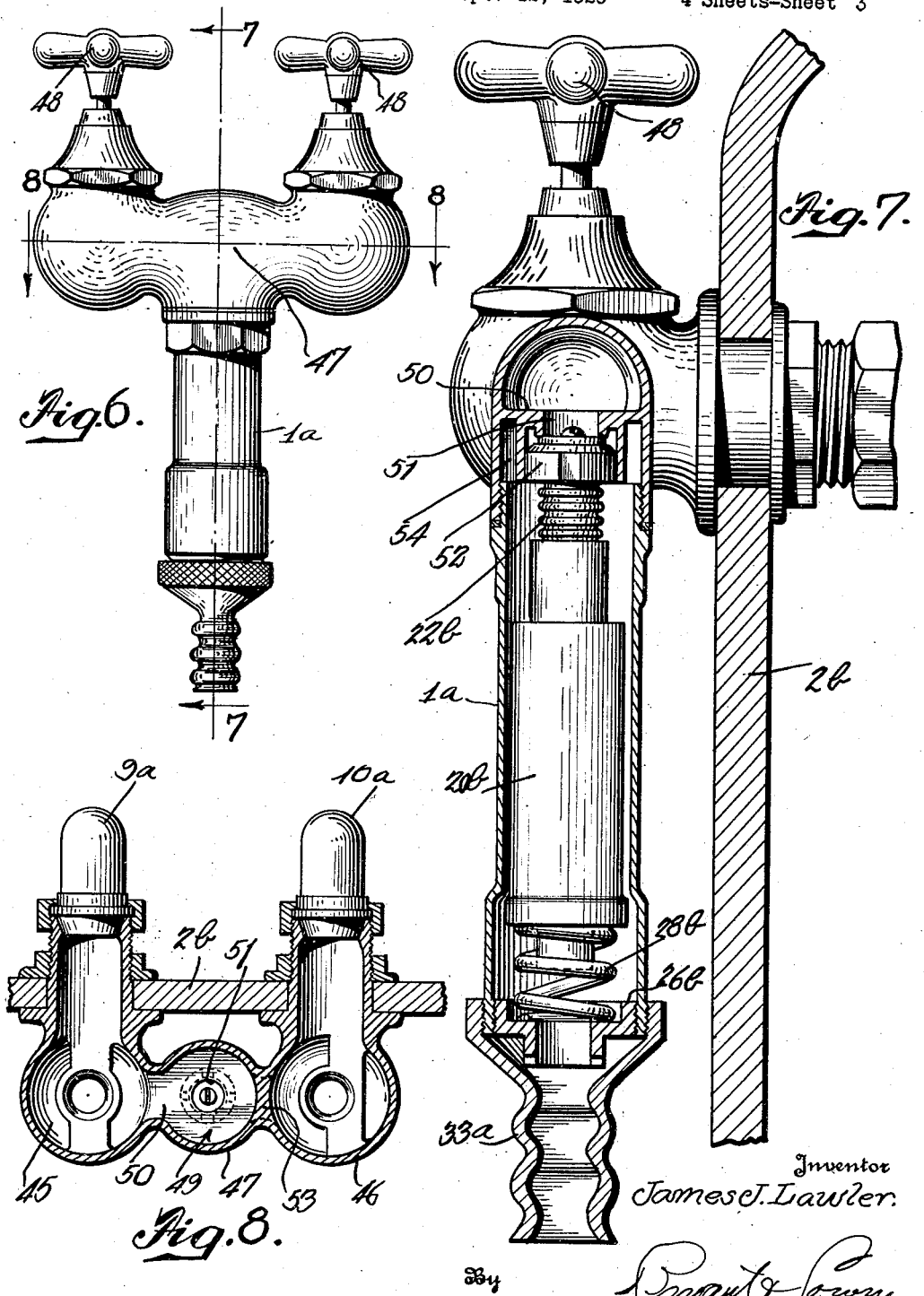

Jan. 6, 1931.  J. J. LAWLER  1,788,112
THERMOSTATIC MIXING VALVE
Filed Sept. 12, 1929   4 Sheets-Sheet 4
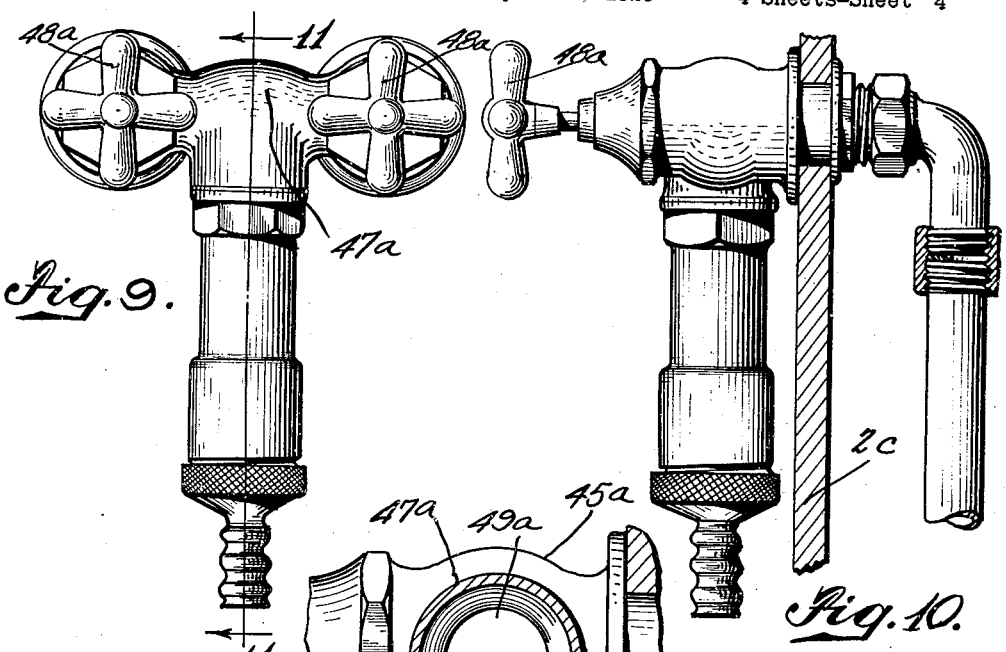
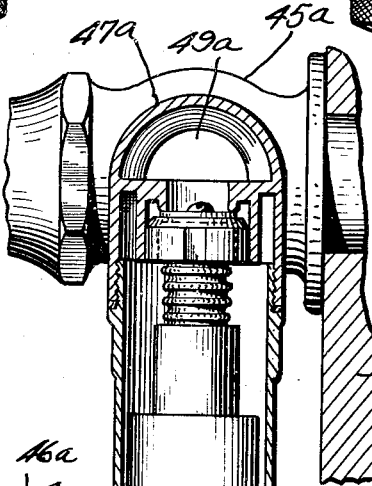
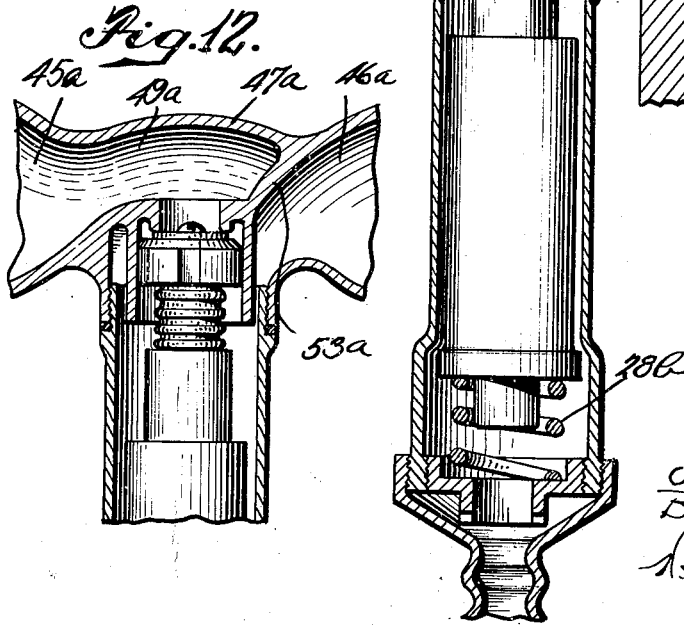
Inventor
James J. Lawler.
By
Bryant & Lowry
Attorneys Patented Jan. 6, 1931

1,788,112

UNITED STATES PATENT OFFICE

JAMES J. LAWLER, OF MOUNT VERNON, NEW YORK

THERMOSTATIC MIXING VALVE

Application filed September 12, 1929. Serial No. 392,227.

This invention relates to certain new and useful improvements in thermostatic mixing valves.

The primary object of the invention is to provide a thermostatic mixing valve of general application and wherever it is desired to regulate the temperature of the joint flow of hot and cold water, the valve being of the type having hot and cold water inlets and a single outlet with a thermostatic element in the path of flow of the hot and cold water to the single outlet and adapted for the operation of a valve controlling the hot water inlet whereby adjustment of the thermostatic element may be manually set for regulating the temperature of the water flowing through the single outlet.

With the above and other objects in view that will become apparent as the nature of the invention is better understood, the same consists in the novel form, combination and arrangement of parts hereinafter more fully described, shown in the accompanying drawings and claimed.

In the drawings:—

Figure 3 is a side elevational view with the wall structure shown in section of one of a battery of basin or trough faucets;

Figure 4 is a front elevational view of the device shown in Figure 3 illustrating the valve handle for hot and cold water;

Figure 5 is a vertical cross-sectional view taken on line 5—5 of Figure 4 showing another form of thermostatic element;

Figure 6 is a front elevational view of a bath tub faucet with the control valves for the hot and cold water located at the upper side of the valve casing;

Figure 7 is an enlarged vertical sectional view taken on line 7—7 of Figure 6 showing the faucets set into the side walls of a bath tub;

Figure 8 is a horizontal sectional view taken on line 8—8 of Figure 6;

Figure 9 is a front elevational view of another form of faucet or mixing valve showing the control handles for the hot and cold water valves extending horizontally from the valve casing;

Figure 10 is a side elevational view of the valve shown in Figure 9 with an associated wall shown in section, this form of valve or faucet being associated with a bath tub of the built-in type;

Figure 11 is an enlarged vertical sectional view taken on line 11—11 of Figure 9; and Figure 12 is a fragmentary sectional view through the valve casing shown in Figure 9.

Figure 1:
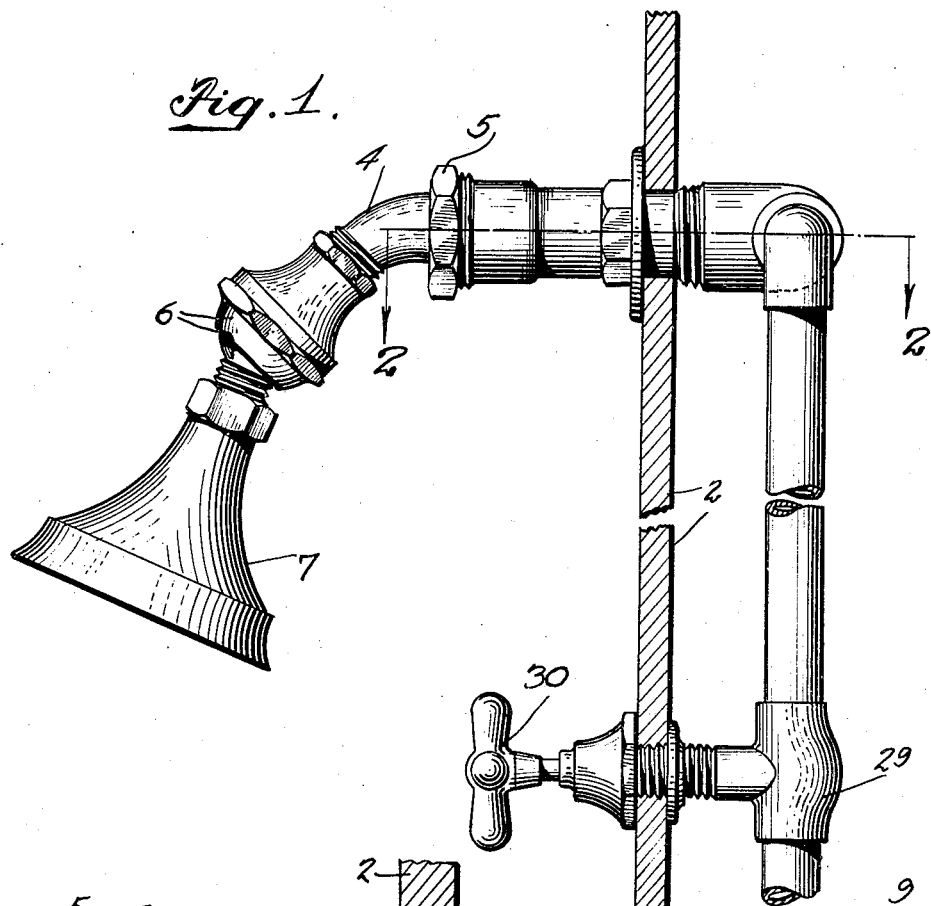
Figure 1 is a fragmentary side elevational view of a bath shower spray and associated valve structure and water supply control constructed in accordance with the present invention, the wall structure with which the valve structure is associated being illustrated in section.
Figure 2:
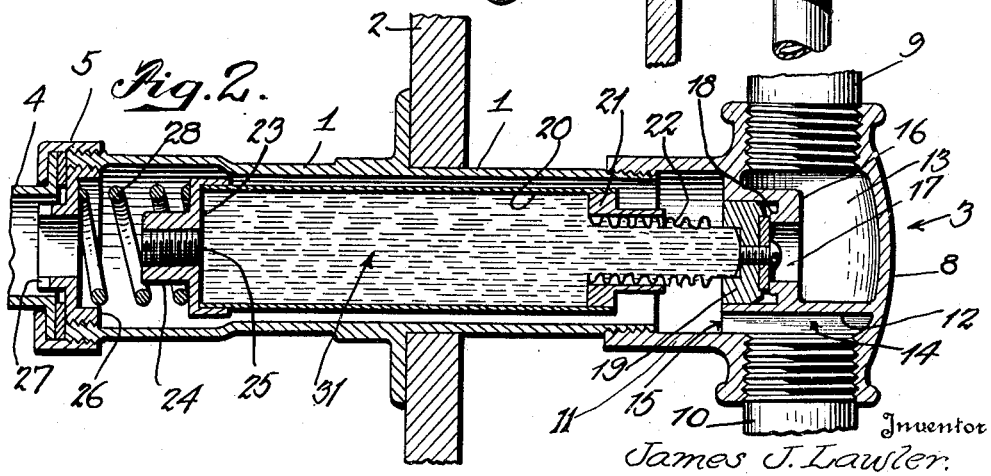
Figure 2 is an enlarged horizontal sectional view taken on line 2—2 of Figure 1 showing the thermostatic element interposed between the hot and cold water supply pipes of the valve structure and the single outlet.

In the form of the invention illustrated in Figures 1 and 2, the thermostatic mixing valve is shown in connection with a bath shower spray and is intended for regulating and controlling the temperature of water flowing through the spray nozzle. A casing or pipe section 1 extends through the wall 2 and is suitably anchored therein, the inner end of the pipe section 1 rearwardly of the wall 2 being attached to a valve casing 3, while the forward projecting end of the pipe section 1 has a depending elbow 4 anchored thereto by a water tight connection including a jamb nut 5, the outer end of the elbow 4 having a universal connection 6 with a shower nozzle 7.

The valve casing 3 is of T-formation and has a body portion 8 threaded at opposite ends as shown in Figure 2 with which hot and cold water supply pipes 9 and 10 respectively are connected, the side leg 11 of the valve 3 having a screw threaded connection with the inner end of the pipe section 1. A cross wall or partition 12 is provided in the valve body 8 to form a hot water chamber 13 and a cold water chamber 14, the partition 12 being located off center and adjacent the cold water inlet as illustrated to provide a restricted passage 15 to the leg 11 of the valve and pipe section 1. A wall 16 extends between the partition 12 and the hot water inlet end of the valve body at right angles to the partition 12 with a central opening 17 therein to permit the flow of hot water from the chamber 13 to the pipe section 1 with a valve seat 18 surrounding the opening 17 at the outlet side of the wall 16. The valve seat 18 has a loosely mounted or floating valve 19 with a renewable face as illustrated associated therewith for controlling the flow of hot water through the opening 17.

A thermostatic element is located in the pipe section 1 and in the path of flow of hot water from the chamber 13 and cold water from the chamber 14 and is engaged with the valve 19 to move the valve toward its seat and close the same when the temperature of the water in the pipe section 1 which constitutes a mixing chamber exceeds a predetermined degree, the thermostatic element, a cylindrical metallic casing 20 of less diameter than the pipe section 1 so that water may flow therearound, the end of the casing 20 adjacent the valve 3 being provided with a tubular nipple 21 through which an expansible tube 22 extends, the inner end of the expansible tube 22 being anchored to the inner end of the nipple 21 while the outer end thereof is engaged with the floating valve 19. The opposite end of the casing 20 of the thermostatic element is closed by a cap 23 carrying a central internally threaded tubular boss 24 closed by a screw plug 25. The casing 20 and expansible tube 22 are filled with a fluid such as kerosene oil for instance, through the apertured boss 20 and thereafter closed to atmosphere by the screw plug 25. The outer end of the pipe section 1 is internally threaded to receive an adjustable screw ring 26 having a key engaging side 27 while a coil spring 28 is interposed between the ring 26 and the casing cap 23 for tensioning the casing and expansible tube 22 relative to the valve 19 and for determining or regulating the degree of temperature of the water flowing through the device.

The hot and cold water pipes 9 and 10 are each equipped with a control valve 29 having the valve stem projecting through the wall 2 and provided at its forwardly projecting end with an operating handle 30. When the valves 29 of the hot and cold water pipes 9 and 10 are opened, water flows into the pipe section 1 around the thermostatic casing 20 and expansible tube 22, the hot water flowing from the chamber 13 through opening 17 and unseating the valve 19 while cold water flows from the chamber 14 through the opening 15 into the pipe section 1. By adjusting the ring 26 for varying the tension of the spring 28 on the thermostatic casing 20, the expansible tube 22 is operated for positively closing the valve 19 on its seat 18 when the temperature of the water flowing through the pipe section 1 reaches a predetermined degree so that it will be impossible to cause water to flow through the shower nozzle 7 at a temperature higher than the degree for which the apparatus is set. Should the hot water supply be turned on first, the same will flow into the pipe section 1 and immediately act upon the thermostatic element for causing the expansible tube 22 to seek the valve 19. With the hot water supply open for delivery, the cold water supply may be operated and the cold water will flow onto the thermostatic element to contract the fluid 31 and permit pressure of hot water in the chamber 17 to compress the expansible tube 22 and unseat the valve 19. The water will flow with an even temperature which may be varied at will by adjusting the screw ring 26.

In the form of the invention illustrated in Figures 3 to 5, the thermostatic element is associated with the water spigot or nozzle known as a hand washer, the nozzles being arranged in a series or battery above a basin or trough and supported on a wall 2a. The pipe section 32 that is vertically disposed carries at its upper end an inverted U-shaped faucet 33, the lower end of the pipe section 32 being attached to the valve body 34 with which lateral hot and cold water supply valves 35 and 36 respectively are associated and controlled by the valve handles 37. The valve body 34 is provided with a cross-wall in which a valve seat 39 is adjustably mounted, the lower end of the valve seat 39 having an opening 40 therein communicating with the chamber 41 in the valve body which receives a supply of hot water. The cold water supply valve 36 is in communication with the chamber 42 at the opposite side of the partition 36. A floating valve 43 is associated with the valve seat 39.

The thermostatic element is located in the pipe section 32 and includes a thermostatic casing 20a closed at its upper end by the cap 23a with a filling opening for the fluid 31a closed by the screw plug 25a, the coil springs 28a being interposed between the cap 23a and annular shoulder 26a on the pipe section 32. A tubular member 21a is secured in the lower end of the thermostatic casing 20a and constitutes a guide for the expansible tube 22a the latter being secured at its inner end to the inner end of the tubular member 21a and in communication with the interior of the thermostatic casing 20a while the outer end thereof is closed and disposed in contact with the valve 39. A rod 44 is located within the expansible tube 22a being anchored at its lower end to the lower closed end of the expansible tube and occupies practically the entire area within the expansible tube so that the relatively small quantity of fluid contained therein will be more sensitive to temperature changes of water flowing through the pipe section 32. The operation of this thermostatic element and associated valve structure is identical with the form of the invention shown in Figures 1 and 2, the hot water flowing through the opening 40 by way of the valve 39 to the pipe section 32 while cold water from the valve 36 enters the chamber 42 and flows around the thermostatic casing 28 together with the hot water. The temperature of the water flowing through the valve or mixing casing may be controlled by adjusting the valve seat 39 in the cross wall 38 to vary the tension of the spring 28a, in its action in enclosing the valve 39 upon its seat.

In the form of the invention illustrated in Figures 6 to 8, the thermostatic mixing valve is illustrated as associated with an open bath tub of the type usually spaced from the wall of a bath room, the reference numeral 2b designating the wall of the bath tub supporting the valve structure therein as shown in Figures 7 and 8. Hot and cold water pipes 9a and 10a respectively communicate with chambers 45 and 46 of a valve casing 47, the flow of water being controlled by the valve handles 48. The valve casing 47 comprises a central chamber 49 in communication with the valve chamber 45, the chamber 49 having a partition wall 50 therein provided with a central opening 51 closed by the valve 52, water from the cold water chamber 46 being cut off from communication with the hot water chamber 49 by the partition 53 and flowing into the pipe section 1a by way of the passage 54. A thermostatic casing 20b is located within the pipe section 1a and includes an expansible member 22b engaged with the valve 52, the lower end of the thermostatic casing 20b having the spring 28b engaged therewith with the tension thereof varied by the adjustable screw ring 26b. An outlet spout or nozzle 33a is detachably engaged with the lower end of the pipe section 21a. The operation of this valve structure is identical with the forms of the invention shown in Figures 1 to 5 and the temperature of the water flowing through the nozzle 33a may be controlled and regulated.

The type of thermostatic mixing valve illustrated in Figure 9 to 12 is associated with a bath tub of the built-in type and is of a construction similar to the form of the invention illustrated in Figures 6 to 8 except valve handles 48a for the hot and cold water supply pipes are horizontally disposed and in the plane of the valve body 47a. The hot water chamber 45a is in communication with the chamber 49a with the valve body 47a, the chamber 49a being cut off from communication with the cold water chamber 46a by the partition walls 53a, the valve structure otherwise remaining the same and the same reference numerals on these figures indicate corresponding parts of the invention as shown in Figures 6 to 8, and the description of the latter group of figures may also be read on Figures 9 to 12. The sectional wall 2c may either be a part of the wall of a built-in tub structure or a bath room wall above the tub.

From the above detailed description of the invention, it is believed that the construction and operation thereof will at once be apparent, it being noted that the thermostatic element controls the valves for the supply of hot water, while both the hot and cold water supplies flow over the thermostatic element. By adjusting the springs engaged with the thermostatic element, and also the valve seat 39 in Figure 5, the closing movement of the valves under influence of the thermostatic element may be varied to regulate the temperature of water flowing through the outlets for use. For instance, if the thermostatic element is set to deliver water at 100° temperature and the hot water supply alone is turned on, the same will immediately cause an expansion of the thermostatic element to close the hot water supply. When the cold water is turned on, the same flows over the thermostatic element and effects contraction thereof with the automatic opening of the valve engaged by the thermostatic element to permit the flow of hot water so that an even and constant temperature of water delivered through the mixing valve is possible.

I claim:—

1. A thermostatic mixing valve comprising a mixing pipe with an outlet and separate inlets for hot and cold water, a thermostatic element containing a fluid for controlling the hot water inlet, adjusting means for the thermostatic element to regulate the temperature of water outletting from the mixing pipe, including a coil spring engaged with the thermostatic element at the end thereof spaced from the hot water inlet, and means for varying the tension of the spring.

2. A thermostatic mixing valve comprising a mixing pipe with an outlet and separate inlets for hot and cold water, a floating valve for the hot water inlet, a thermostatic element for controlling operation of the valves and the inlet of hot water, adjusting means for the thermostatic element to regulate the temperature of water outletting from the mixing pipe, including a coil spring engaged with the thermostatic element at the end thereof spaced from the hot water inlet, and means for varying the tension of the spring.

3. A thermostatic mixing valve comprising a mixing pipe, an outlet nozzle on one end thereof, a valve casing on the other end, having separate inlet passages for hot and cold water separately communicating with the mixing pipe, a valve controlling the flow of hot water to the mixing pipe, a thermostatic element in the mixing pipe engaged with the hot water valve to regulate the temperature of water flowing to the outlet nozzle, the thermostatic element including a tubular casing having an expansible tube at one end engaged with the hot water valve.

4. A thermostatic mixing valve comprising a mixing pipe, an outlet nozzle on one end thereof, a valve casing on the other end, having separate inlet passages for hot and cold water separately communicating with the mixing pipe, a valve controlling the flow of hot water to the mixing pipe, a thermostatic element in the mixing pipe engaged with the hot water valve to regulate the temperature of water flowing to the outlet nozzle, and means for rendering the thermostat variably operable, the thermostatic element including a tubular casing having an expansible tube at one end engaged with the hot water valve.

5. A thermostatic mixing valve comprising a mixing pipe, an outlet nozzle on one end thereof, a valve casing on the other end, having separate inlet passages for hot and cold water separately communicating with the mixing pipe, a valve controlling the flow of hot water to the mixing pipe, a thermostatic element in the mixing pipe engaged with the hot water valve to regulate the temperature of water flowing to the outlet nozzle, the thermostatic element including a tubular casing having an expansible tube at one end engaged with the hot water valve, and a plug set into the expansible tube to reduce the interior area thereof and render the volatile fluid therein more sensitive to the action of the hot water entering the mixing pipe.

6. A thermostatic mixing valve comprising a mixing pipe, an outlet nozzle on one end thereof, a valve casing on the other end, having separate inlet passages for hot and cold water separately communicating with the mixing pipe, a valve controlling the flow of hot water in the mixing pipe, a thermostatic element in the mixing pipe engaged with the hot water valve to regulate the temperature of water flowing to the outlet nozzle, means for rendering the thermostat variably operable, the thermostatic element including a tubular casing having an expansible tube at one end engaged with the hot water valve, and a plug set into the expansible tube to reduce the interior area thereof and render the fluid therein more sensitive to the action of the hot water entering the mixing pipe.

7. A thermostatic mixing valve comprising a mixing pipe with an outlet and separate inlets for hot and cold water, a floating valve for the hot water inlet, a thermostatic element for controlling operation of the valve and the inlet of hot water, and an adjustable seat for the valve to vary the length of closing movement of the valve and to regulate the temperature of water delivered from the mixing pipe.

In testimony whereof I affix my signature.

JAMES J. LAWLER.